(12) United States Patent
Ganapathiappan et al.

(10) Patent No.: US 7,910,649 B2
(45) Date of Patent: Mar. 22, 2011

(54) MALEIMIDE-CONTAINING LATEX DISPERSIONS

(75) Inventors: Sivapackia Ganapathiappan, Palo Alto, CA (US); Zhang-Lin Zhou, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 11/545,863

(22) Filed: Oct. 10, 2006

(65) Prior Publication Data

US 2008/0085950 A1  Apr. 10, 2008

(51) Int. Cl.
  *C09D 11/00* (2006.01)
  *C08F 2/10* (2006.01)
  *C08F 22/40* (2006.01)

(52) U.S. Cl. ........ 524/458; 526/262; 526/263; 526/264; 106/31.13; 106/31.25; 106/31.27

(58) Field of Classification Search .......... 524/457–458; 106/31.13, 31.25, 31.27; 526/259–265
  See application file for complete search history.

(56) References Cited

U.S. PATENT DOCUMENTS

| | | | |
|---|---|---|---|
| 5,708,095 A | 1/1998 | Grezzo Page et al. | |
| 5,936,008 A | 8/1999 | Jones et al. | |
| 5,981,651 A | 11/1999 | Patel et al. | |
| 5,990,202 A | 11/1999 | Nguyen et al. | |
| 6,031,019 A | 2/2000 | Tsutsumi et al. | |
| 6,057,384 A * | 5/2000 | Nguyen et al. | 523/160 |
| 6,239,193 B1 | 5/2001 | Cheng et al. | |
| 6,306,994 B1 | 10/2001 | Donald et al. | |
| 6,417,249 B1 | 7/2002 | Nguyen et al. | |
| 6,541,590 B1 | 4/2003 | Johnson et al. | |
| 2002/0198287 A1 | 12/2002 | Ohta et al. | |
| 2003/0176532 A1 | 9/2003 | Chung et al. | |
| 2004/0266954 A1 * | 12/2004 | Jen et al. | 525/326.1 |
| 2005/0014924 A1 * | 1/2005 | Inaba et al. | 528/310 |
| 2005/0027065 A1 * | 2/2005 | Zhou et al. | 524/556 |
| 2005/0176922 A1 * | 8/2005 | McManus et al. | 528/310 |
| 2006/0173125 A1 * | 8/2006 | Lawson et al. | 524/571 |

OTHER PUBLICATIONS

Zhu et a. Organic Letters 2006, vol. 8, No. 22. 4993-4996.*
McElhanon et al. Langmuir 2005, 21, 3259-3266.*
Mantovani et al. Journal of the American Chemical Society 2005, 127(9), 2966-2973.*
Rabelero et al. Polymer Bulletin 38 pp. 695-700 (1997).*
Dispinar et al. "A Diels-Alder/Retro Diels-Alder Strategy to Synthesize Polymers Bearing Maleimide Side Chains". Journal of Polymer Science, Part A. vol. 45, pp. 4545-4551 (2007).*

* cited by examiner

*Primary Examiner* — Mark Eashoo
*Assistant Examiner* — Michael A Salvitti

(57) ABSTRACT

The present invention is drawn to the use of blocked maleimide monomers for the preparation of latex particles, including those having active maleimide surface groups. In accordance with this, a method of forming latex particulates can comprise the steps of preparing a monomer emulsion including an aqueous phase and an organic monomer phase, wherein the organic monomer phase includes at least one blocked maleimide monomer; polymerizing the organic monomer phase to form blocked maleimide latex particulates dispersed in the aqueous phase; and unblocking the blocked maleimide latex particulates to form latex particulates with active maleimide groups at least on the surface of the latex particulates.

20 Claims, No Drawings

MALEIMIDE-CONTAINING LATEX DISPERSIONS

FIELD OF THE INVENTION

The present invention relates generally to blocked maleimide monomers used to prepare latex particles with maleimide surface groups. Such modified latexes can be used effectively in latex-containing ink-jet inks as well as other applications.

BACKGROUND OF THE INVENTION

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Though there has been great improvement in ink-jet printing technology, there is still improvement that can be made in many areas.

With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks typically have low viscosity to accommodate high frequency jetting and firing chamber refill processes common to ink-jet architecture.

In addition to general image fade that occurs with many ink-jet ink printing systems, ink-jet prints have also been known for poor durability when exposed to water or high humidity. This results from the use of water-soluble and water dispersible colorants within the water-based ink. There has been great improvement in the area of water durability of ink-jet inks through incorporation of certain ink-jet compatible latexes.

The latex can comprise small micron or submicron hydrophobic polymeric particles of high molecular weight that are dispersed in an aqueous fluid, which fluid ultimately can become part of a liquid vehicle of an ink-jet ink. When printed as part of an ink-jet ink, latex particulates of the ink can form a hydrophobic print film on a media surface, entrapping and protecting the colorant within the film.

There is continued research regarding providing new latexes that would be useful in the ink-jet arts, as well as in other areas of technology where latexes can be used.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which latex particulates or colloids are dissolved or dispersed to a fluid suspension in accordance with embodiments of the present invention. In one embodiment, colorants can be added to the liquid vehicle form ink-jet inks in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and water. In one embodiment, an aqueous phase of a latex dispersion can become part of a liquid vehicle of a secondary composition such as an ink.

"Colorant" can include dyes, pigments, and/or other particulates that may be suspended or dissolved in an ink vehicle containing latex particulates prepared in accordance with embodiments of the present invention. Dyes are typically water soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle.

The term "monomer emulsion" refers to an organic monomer or monomer mix that is emulsified in an aqueous or water phase.

The term "latex" or "latex dispersion" by definition includes both latex particulates as well as the aqueous medium in which the latex particulates are dispersed.

The term "latex particulates" or "latex particles" are the polymeric masses that are dispersed in the latex dispersion.

The term "blocked maleimide" when referring to monomers or latex particulates includes a maleimide group that is substantially inactivated or protected for purposes of polymerization by a blocking group. In accordance with embodiments of the present invention, when a maleimide group of a monomer is blocked, it can be polymerized in the organic phase of a monomer emulsion to form a latex dispersion, and further, can be unblocked to activate or expose the maleimide group to the surrounding environment.

The term "active maleimide" when referring to latex particulates refers to particulates that have maleimide groups that are copolymerized into a latex particulate, and where the maleimide groups are exposed to the surrounding environment without a blocking group at least at the surface of the latex particulate.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The term "about" when referring to a numerical value or range is intended to encompass the values resulting from experimental error that can occur when taking measurements.

Latex particles obtained by emulsion polymerization can have a variety of applications, such as model colloids for calibration of instruments used to measure particle size, immobilization of biomolecules (such as proteins or peptides) on the surface of the particles, in the development of new types of immunoassays, and for film formation for ink, paint, and coating applications. For example, there are commonly used methods to connect molecules, e.g., biological molecules or dye molecules, to the surface of latex particles, such as by physical or passive adsorption. However, the resulting colloid systems are not typically stable. This instability can be avoided by covalent bond formation between biomolecules or dye molecules with latex polymer.

Preparing latexes having certain types of amino-functionalized latex particulates are known. However, these types of latex polymers are typically used to react with electrophilic dyes or other molecules such as triazine chloride. Conversely, nucleophilic dyes and other similar molecules cannot easily be attached to many latex polymer surfaces. As there are a variety of nucleophilic dyes and other molecules with nucleophilic groups such as $-NH_2$, $-RNH$, $-SH$, $-OH$, etc., it has been recognized that there is a need for latex polymers which include a functional group that will react with nucleophilic groups of various types of colorants or other molecules.

In accordance with this, a practical method is provided for preparation of latex polymer particles with maleimide functional groups on the surface. Specifically, monomers can be prepared which include maleimide groups that are protected with a Diels-Alder adduct, for example, the Diels-Alder adduct with furan, thiofuran, or cyclopentandiene. These "blocked maleimide" groups are stable under normal emulsion polymerization conditions. Thus, a latex particle colloidal system can be formed with a protected maleimide group on at least the surface (depending on how the monomers are added, e.g., throughout the polymerization process which would cause these groups to be present throughout the latex, or alternatively, toward the end of the polymerization which would cause these groups to be present more at the surface of the latex particulates). Upon heating, a retro Diels-Alder reaction is caused to take place and the blocked maleimide group becomes unblocked, thereby exposing an active maleimide group on the surface of the already formed latex particulates. These active maleimide groups are generally reactive toward nucleophilic groups.

In accordance with this, a method of forming latex particulates with active maleimide groups can comprise steps of preparing a monomer emulsion including an aqueous phase and an organic monomer phase, wherein the organic monomer phase includes at least one blocked maleimide monomer; polymerizing the organic monomer phase to form blocked maleimide latex particulates dispersed in the aqueous phase; and unblocking the blocked maleimide latex particulates to form latex particulates with active maleimide groups at least on the surface of the latex particulates.

Alternatively, a latex dispersion can comprise an aqueous phase, and latex particulates dispersed in the aqueous phase. The latex particulates can include surface maleimide groups prepared by removing an associated blocking group present during polymerization of the latex particulates. In an alternative embodiment, a latex dispersion can comprise an aqueous phase and blocked maleimide latex particulates dispersed in the aqueous phase.

In another embodiment, a latex-containing ink-jet ink can comprise a liquid vehicle, a colorant dissolved or dispersed in the liquid vehicle, and latex particulates dispersed in the liquid vehicle. The latex particulates can be formed by the steps of preparing a monomer emulsion including an aqueous phase and an organic monomer phase, wherein the organic monomer phase includes at least one blocked maleimide monomer; polymerizing the organic monomer phase to form blocked maleimide latex particulates dispersed in the aqueous phase; and unblocking the blocked maleimide latex particulates to form latex particulates with active maleimide groups at least on the surface of the latex particulates.

Preparation of latex particulates which include maleimide groups can be prepared in accordance with the following general scheme, as illustrated in Formula 1 below:

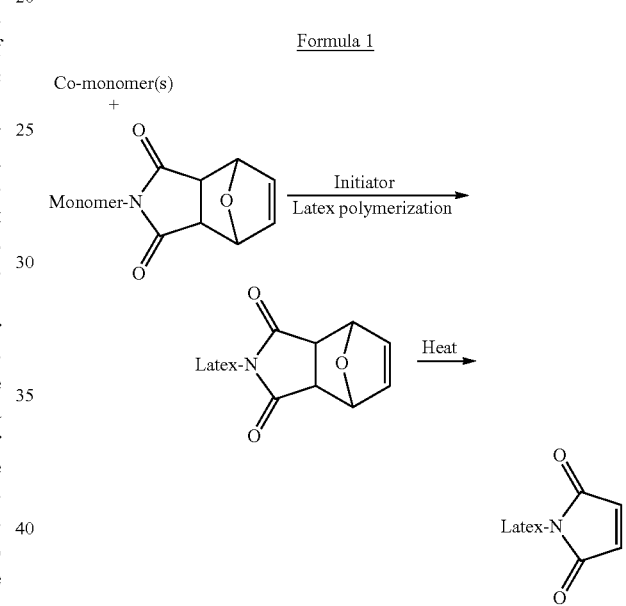

As shown above in Formula 1, one or more co-monomer can be copolymerized with a monomer which includes a blocked maleimide group. The copolymerization can be carried out by admixing the monomers together in a common emulsion polymerization batch to form a random copolymer having relatively uniform amounts of each "mer" throughout the polymer, or the various monomers can be added in sequence to cause certain monomers to be present earlier or later along the polymer chain. For example, if the desire is to have maleimide groups present primarily at the surface of the latex particulates, these monomers can be added at the end of the reaction sequence. Once copolymerized to form blocked maleimide latex particulates, heat can be applied to cause a retro Diels-Alder reaction to occur, causing the blocked maleimide group(s) to become unblocked. The resulting latex includes active surface maleimide groups. This reaction sequence provides the benefit of allowing maleimide groups to be generated at the surface of the latex, but because of the associated blocking groups, the maleimide groups are rendered relatively inert and do not interfere with emulsion polymerization. Thus, excellent latex particulates can be formed, and after formation of the latex particulates, unblocking can occur to expose the more reactive maleimide groups.

In order to prepare the latexes in accordance with embodiments of the present invention, blocked maleimide monomers are prepared, three of which are exemplified (7, 9, and 11) in Formula 2 below:

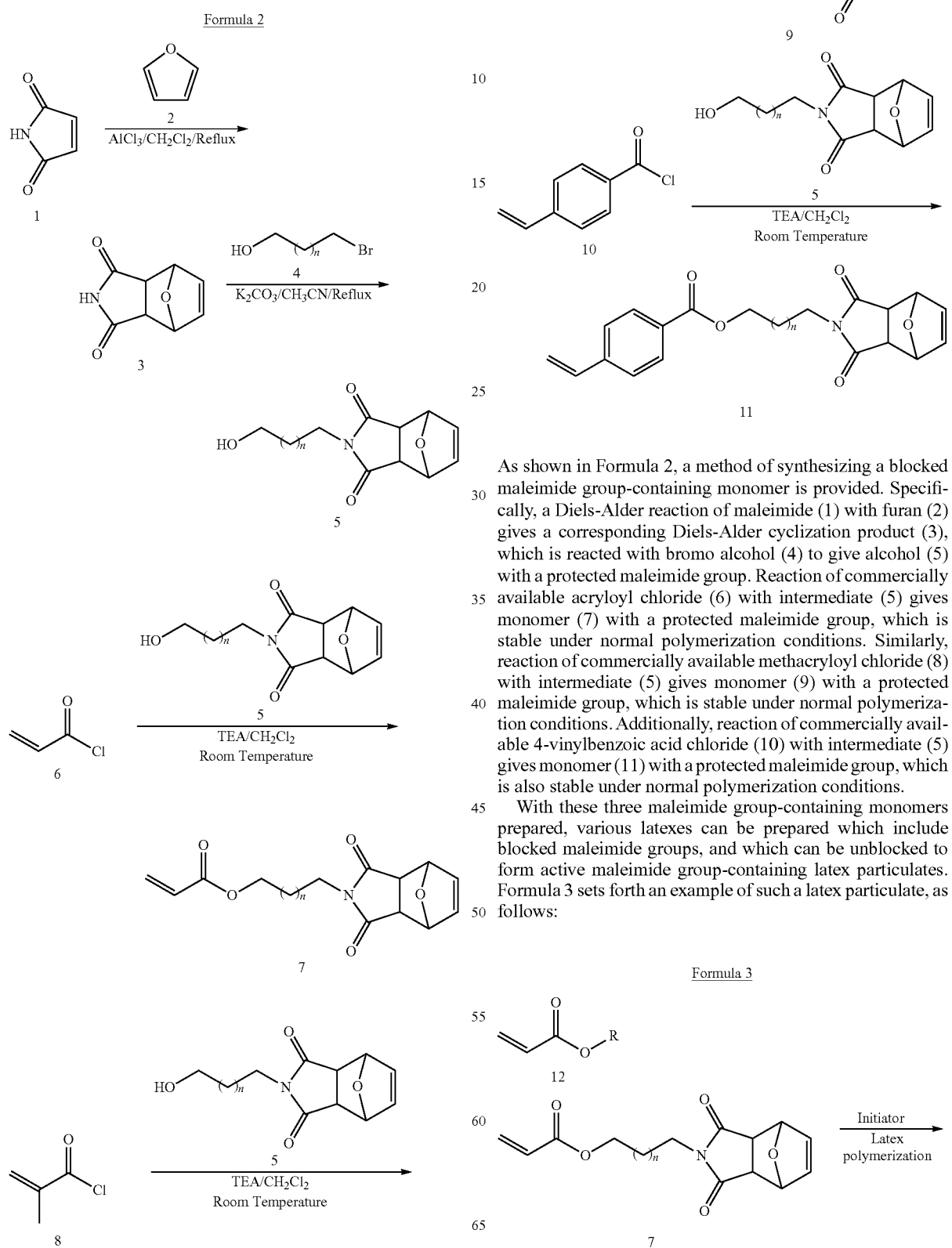

Formula 2

As shown in Formula 2, a method of synthesizing a blocked maleimide group-containing monomer is provided. Specifically, a Diels-Alder reaction of maleimide (1) with furan (2) gives a corresponding Diels-Alder cyclization product (3), which is reacted with bromo alcohol (4) to give alcohol (5) with a protected maleimide group. Reaction of commercially available acryloyl chloride (6) with intermediate (5) gives monomer (7) with a protected maleimide group, which is stable under normal polymerization conditions. Similarly, reaction of commercially available methacryloyl chloride (8) with intermediate (5) gives monomer (9) with a protected maleimide group, which is stable under normal polymerization conditions. Additionally, reaction of commercially available 4-vinylbenzoic acid chloride (10) with intermediate (5) gives monomer (11) with a protected maleimide group, which is also stable under normal polymerization conditions.

With these three maleimide group-containing monomers prepared, various latexes can be prepared which include blocked maleimide groups, and which can be unblocked to form active maleimide group-containing latex particulates. Formula 3 sets forth an example of such a latex particulate, as follows:

Formula 3

-continued

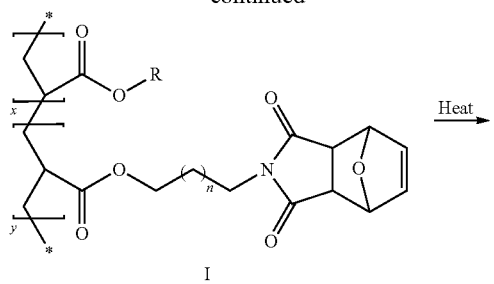

I

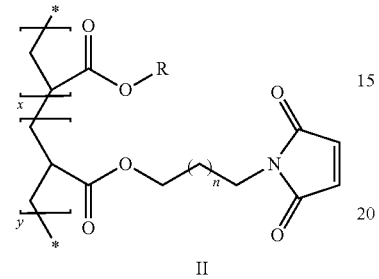

II where x and y represent the number of monomer units of the polymer backbone, ranging from 1 to 99, for example; n represents the number of methylene units, ranging from 1 to 25, for example; and R represents H, alkyl, aryl, or substituted aryl groups, including, but not limited to, methyl, ethyl, n-propyl, iso-propyl, n-butyl, iso-butyl, t-butyl, various pentyls, various hexyls, etc. Further, as shown in Formula 3, an acrylic monomer with a protected maleimide group (7) is dispersed with another acrylic ester co-monomer (12). Optionally, additional and/or alternative co-monomers can be present, though not shown in this Formula. These can be added together throughout the polymerization process, or the acrylic monomer (7) can be added in a more concentrated manner or even started toward the end of the polymerization process. Upon emulsion polymerization, a latex particle colloidal system (I) is formed with a protected maleimide group on the surface. It is noted that this example shows only one unit each of monomer (7) and monomer (12) in the latex particle colloidal systems (I and II). This is for convenience, as the monomers are not necessarily present in equal molar ratios or in an alternating arrangement, and are not always both present throughout the polymer—this structure merely notes that both are present in the polymer as a whole. Upon treatment with a heating process, e.g., 40° C. to 95° C. in this and other embodiments, maleimide functional groups are formed on the surfaces of the latex colloidal system (II), which is reactive towards nucleophilic groups such as —NH$_2$, —RNH, —SH, —OH, etc., and can be useful for further surface modification and/or bio-conjugation.

Formula 4 set forth below sets forth an alternative embodiment, as follows:

Formula 4

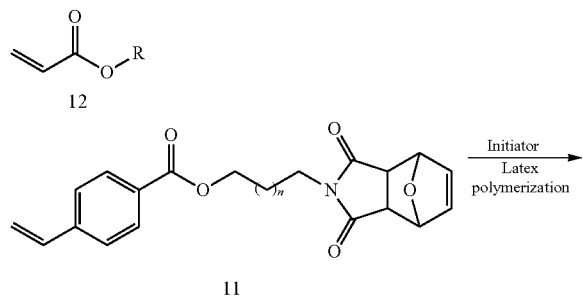

-continued

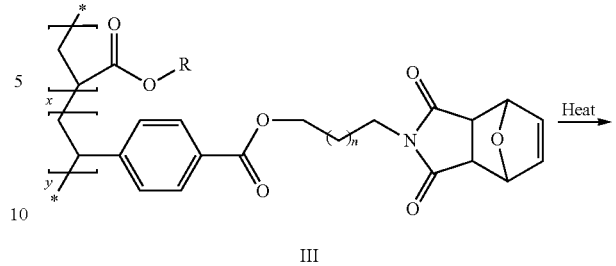

III

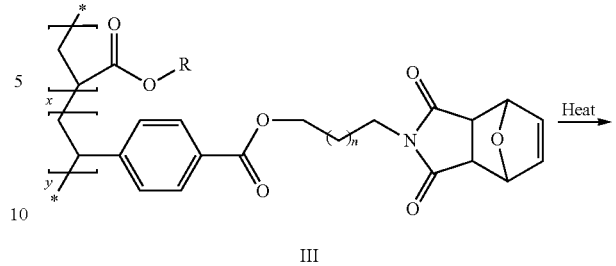

IV where x and y represent the number of monomer units of the polymer backbone, ranging from 1 to 99, for example; n represents the number of methylene units, ranging from 1 to 25, for example; and R represents H, alkyl, aryl, or substituted aryl groups, including, but not limited to methyl, ethyl, n-propyl, iso-propyl, n-butyl, iso-butyl, t-butyl, various pentyls, various hexyls, etc. Further, as shown in Formula 4, a vinylbenzoic ester monomer with a protected maleimide group (11) is dispersed with an acrylic ester co-monomer (12). Optionally, additional and/or alternative co-monomers can be present, though not shown in this Formula. These monomers can be added together throughout the polymerization process, or the vinylbenzoic ester monomer (11) can be added in a more concentrated manner or even started toward the end of the polymerization process. Upon emulsion polymerization, a latex particle colloidal system (III) is formed with a protected maleimide group on the surface. It is noted that this examples shows only one unit of monomer (11) and monomer (12) in the latex particle colloidal systems (III and IV). This is for convenience, as the monomers are not necessarily present in equal molar ratios or in an alternating arrangement, and are not always both present throughout the polymer—this structure merely notes that both are present in the polymer as a whole. Upon treatment with a heating process, e.g., 45° C. to 99° C. in this and other embodiments, maleimide functional groups are formed on the surfaces of the latex colloidal system (IV), which is reactive towards nucleophilic groups such as —NH$_2$, —RNH, —SH, —OH, etc., and can be useful for further surface modification and/or bio-conjugation.

Formula 5 below illustrates yet another embodiment which can be practiced in accordance with embodiments of the present invention, as follows:

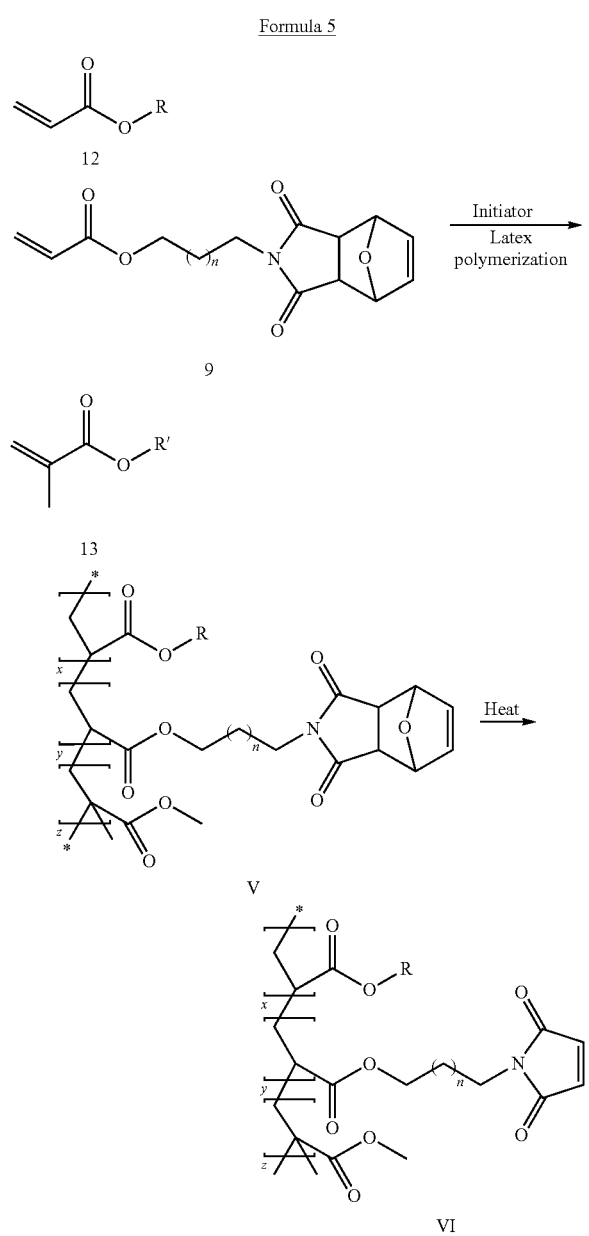

where x and y represent the number of monomer units of the polymer backbone, ranging from 1 to 99, for example; n represents the number of methylene units, ranging from 1 to 25, for example; and R represents H, alkyl, aryl, or substituted aryl groups, including, but not limited to methyl, ethyl, n-propyl, iso-propyl, n-butyl, iso-butyl, t-butyl, various pentyls, various hexyls, etc. Further, as shown in Formula 5, an acrylic monomer with a protected maleimide group (9) is dispersed with other acrylic ester co-monomers (12 and 13). Optionally, alternative and/or additional co-monomers can be present, though not shown in this Formula. These can be added together throughout the polymerization process, or the acrylic monomer (9) can be added in a more concentrated manner or even started toward the end of the polymerization process. Upon emulsion polymerization, a latex particle colloidal system (V) is formed with a protected maleimide group on the surface. It is noted that this examples shows only one unit of monomer (9) and monomers (12 and 13) in the latex particle colloidal systems (V and VI). This is for convenience, as the monomers are not necessarily present in equal molar ratios or in alternating arrangement, and are not always both present throughout the polymer—this structure merely notes that both are present in the polymer as a whole. Upon treatment with a heating process, e.g., 45° C. to 99° C. in this and other embodiments, maleimide functional groups are formed on the surfaces of the latex colloidal system (VI), which is reactive towards nucleophilic groups such as —$NH_2$, —RNH, —SH, —OH, etc., and can be useful for further surface modification and/or bio-conjugation.

In accordance with these and other similar embodiments, blocked maleimide monomers that can be used can comprise a vinylic or other polymerizable entity and a blocked maleimide group(s). The vinylic group can be acrylate, methacrylate, styrene, vinylether, or other alkene containing reactive group. Other polymerizable groups that can be used include condensation reactive groups, such as epoxides. Other condensation reactions include the reaction of alcohols with esters to form polyesters; the reaction of phenol, urea or melamine with formaldehyde to form condensation polymers; and the reaction of alcohols and isocyanates to form urethanes. The polymerizable group can be typically reactive under a first set of reactive conditions, and the blocked maleimide group can be unblocked under a second set of conditions, e.g., heat, reaction, UV light, etc.

The blocked maleimide monomers prepared in accordance with embodiments of the present invention can be used to form latex particulates that have active maleimide functionalized surfaces. The aforementioned blocked maleimide monomer can be included in a monomer mix (when copolymerizing with other monomers), and the monomer mix can be incorporated in a pre-emulsion in preparation for emulsion polymerization to form the latex. In one embodiment, if used in a monomer mix, the blocked maleimide monomer can comprise from 0.1 wt % to 70 wt % of the latex monomer mix, and in another embodiment, from 1 w % to 20 wt %. As mentioned, the blocked maleimide monomer can be copolymerized into the entire bulk of the latex particulate, at or near its surface, or throughout the bulk but in a more concentrated amount at the surface. These ranges are merely exemplary; as it is possible to form a latex particle that includes 100 wt % blocked maleimide monomer. Additionally, depending on whether the blocked maleimide monomer is configured to be concentrated at or near the surface of the latex particulates, or is randomly distributed throughout the latex particulates, such a consideration will have an affect on how much blocked maleimide monomer may be desirable to use for a given latex preparation.

Whether the blocked maleimide is homogenously distributed throughout the latex particulate, or is present in a more concentrated amount near the surface, surfactants can be used during the polymerization process to control particle size, as well to disperse the formed latex particles prior to removing the blocking group form the blocked surface maleimides.

When selecting monomers for copolymerization with the blocked maleimide monomer, mixtures of monomers and/or dimers can be selected that provide desired properties for a given application. For example, for ink-jet inks, co-monomers can be selected that are used for controlling latex polymer glass transition temperature, density, dielectric constant, solvent parameters, etc. If utilizing the latexes of the present invention for jetting from thermal ink-jet architecture, the latex particles can be configured to perform under thermal ink-jet printing conditions. In one embodiment, for example, the polymer glass transition temperature of the latex particulates can be in the range of 10° C. to 20° C., the latex particulates can be within a density range from 1.0 to 1.05 g/cm$^3$, the particle surface dielectric constant of the latex particulates can be from 2.0 and 3.0, and/or a 1 wt % to 2 wt % dimer crosslinking agent can be present in the latex particulates. These properties can be selected individually or in combination to contribute to desired ink performance relative to thermal shear stability, freqcel, decel, decap, particle settling, and co-solvent resistance. Examples of preferred co-monomers that can be used include methyl methacrylate, ethyl methacrylate, butyl acrylate, butyl methacrylate, hexyl acrylate, hexyl methacrylate, 2-ethylhexyl methacrylate, styrene, and methyl styrene.

A typical liquid vehicle formulation that can be used with the latexes described herein can include water, and optionally, one or more co-solvents present in total at from 0 wt % to 30 wt %, depending on the ink-jet architecture. Further, one or more non-ionic, cationic, anionic, or amphoteric surfactant(s) can be present, ranging from 0 wt % to 10.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

It is to be noted that the latex dispersions of the present invention inherently include a predominantly aqueous phase (or liquid phase) that can include water and other components, such as surfactants, co-solvents, etc. Thus, the liquid phase of the latex dispersion can be admixed with other components to form a liquid vehicle for certain applications, or the liquid phase can become the liquid vehicle upon addition of desired ingredients, e.g., colorants.

Classes of co-solvents that can be used in the liquid vehicle can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 10.0 wt %. It is to be noted that the surfactant that is described as being usable in the ink vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

With respect to the colorant, an effective amount of either pigment and/or dye can be used to provide desired color or other property to the ink-jet ink. In one embodiment, the colorant can be present at from 0.1 wt % to 10.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Blocked Maleimide Monomer

The preparation of the blocked maleimide monomer is followed generally in accordance with Formula 2 above. Specifically, a mixture of maleimide (1) (19.4 g, 0.2 mol), furan (2) (13.6 g, 0.2 mol), and aluminium chloride (33.25 g, 0.25 mol) in 200 ml of dichloromethane is refluxed under nitrogen atmosphere for 24 hours. After cooling down to room temperature, the mixture is poured onto 250 g of ice-water. The pH value of the mixture is neutralized to around pH 7, then the organic layer is separated. The aqueous layer is further extracted with dicholormethane (2×50 mL). The combined organic layer is washed with saturated sodium bicarbonate, water, and brine, dried over sodium sulfate. Evaporation of solvent and further purification by flash chromatography is carried out, giving exo-3,6-epoxy-1,2,3,6-tetrahydrophthalic anhydride (3) (28 g, 85%) of the product as a white solid.

To a solution of exo-3,6-epoxy-1,2,3,6-tetrahydrophthalic anhydride (3) (16.6 g, 0.1 mol) in 300 mL of methanol is added 3-amino-1-propanol (4a, 7.51 g, 7.6 mL, 0.1 mol) under nitrogen atmosphere. The resulting solution is stirred under reflux for 48 hours. After cooling down to room temperature, the solvent is evaporated in vacuum to give a residue, which is redissolved into 200 mL of dichloromethane and washed with water (3×100 mL). The organic layer is dried over sodium sulfate. Evaporation of solvent and recrystallization from methanol gives compound (5) (14.5 g, 65%) of the product as a white solid.

To a solution of compound (5) (4.0 g, 18 mmol) in 30 mL of dichloromethane is added triethylamine (3 mL), followed by the addition of methacryloyl chloride (1.87 g, 18 mmol) at room temperature under nitrogen atmosphere. The resulting mixture is stirred at room temperature overnight. Then the mixture is diluted with 200 mL of dichloromethane, washed with water (2×50 mL) and brine (50 mL), dried over sodium sulfate. Evaporation of solvent gives the blocked maleimide (9) (4.57 g, 87%) of the product as a white solid. It is noted that compounds (7) and (11) can similarly be prepared as shown generally in Formula 2, with only slight modification, as would be known to one skilled in the art after considering the present disclosure.

Example 2

Preparation of Latex Incorporating Maleimide Surface Groups

Monomer (9) (10 g) of Formula 2 is mixed with methyl methacrylate (90 g) to form a monomer mixture. This monomer mixture is emulsified with Rhodafac RS 710 surfactant (2.5 g; 2.5 wt % with respect to the monomers) in water (40 ml). The monomer emulsion is added drop-wise to water (360 ml) at 60° C. containing a potassium persulfate water soluble initiator (about 0.4 wt % with respect to the monomers). The heating is continued at this temperature for a period of two hours and then cooled to ambient temperature. The particulates formed are present in a latex dispersion or emulsion. In this example, the blocked maleimide groups are present in the latex throughout the particle. The same reaction can be carried out to present the blocked maleimide groups mostly on the surface by adding the above blocked monomer after other monomer(s) of the mixture is/are added. Though a cross-linker is not used in this example, it is to be noted that a cross-linker can be added, e.g., ethylene glycol dimethacrylate from about 0.5 wt % to 10 wt % of monomers to obtain cross-linked latex particulates. The above particulates in water are heated to 95° C. for 5 hours to remove the blocking group and generate the maleimide functional groups on the surface of the latex particulates.

Example 3

Preparation of Latex Incorporating Maleimide Surface Groups

In the Example 2, the monomer (9) is replaced to monomer (7) of Formula 2 and the process is carried out under identical conditions to obtain the latex with at least surface maleimide groups.

Example 4

Preparation of Latex Incorporating Maleimide Surface Groups

In the Example 2, the monomer (9) is replaced to monomer (11) of Formula 2 and the process is carried out under identical conditions to obtain the latex with at least surface maleimide groups.

Example 5

Preparation of an Ink-Jet Ink Including Latex Particulates with Maleimide Surface Groups In this example, the methyl methacrylate (90 g) monomer of Example 2 is replaced to a mixture of methyl methacrylate (45 g) and hexyl methacrylate (45 g) and the process is carried out under identical conditions to obtain the latex with at least surface maleimide groups.

It is noted that in Examples 2 to 5, the hydrophobic monomers can be substituted or supplemented with acrylic monomers, such as butyl methacrylate, and/or vinyl monomer(s), such as a vinyl styrene monomer(s).

Example 6

Ink-Jet Ink Preparation

The latex emulsion prepared in accordance with Example 3 (equivalent to 20 g solid polymer) is mixed with a nucleophilic dye Disperse Yellow 9 (1 g) along with a liquid vehicle (20 g). The liquid vehicle includes a majority of water, as well as 2-pyrrolidone and ethylene glycol in lesser amounts. As the dye selected for use includes a nucleophilic group, the dye molecule reacts with the maleimide of the latex particulates, thereby coupling at least a portion of the dye molecules to the latex particulates.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method of forming latex particulates having active maleimide surface groups, comprising:
   a) preparing a monomer emulsion including an aqueous phase and an organic monomer phase, said organic monomer phase including at least one blocked maleimide monomer in which a maleimide group is protected by a Diels-Alder adduct;
   b) polymerizing monomers of the organic monomer phase to form blocked maleimide latex particulates dispersed in the aqueous phase; and
   c) unblocking the blocked maleimide latex particulates to form latex particulates with active maleimide groups at least on the surface of the latex particulates.

2. A method as in claim 1, wherein the organic monomer phase includes a monomer mix, and wherein the blocked maleimide monomer is present at from 0.1 wt % to 70 wt % of the monomer mix.

3. A method as in claim 1, wherein the polymerizing step occurs such that the organic monomer phase which includes the blocked maleimide monomer is added to other polymerizing monomers at a stage that causes blocked maleimides to be present at a surface of the latex particulates while not being present at a core of the latex particulates.

4. A method as in claim 1, wherein the blocked maleimide monomer is an acrylic or vinyl benzoic ester monomer.

5. A method as in claim 1, wherein the latex particulates with active maleimide groups have an average particle size from 50 nm to 500 nm.

6. A latex dispersion, comprising:
   a) an aqueous phase; and
   b) latex particulates dispersed in the aqueous phase, said latex particulates including maleimide groups which are present at least at a surface of the latex particulates,
   wherein particulates are prepared by emulsion polymerization, wherein blocking groups comprising Diels-Alder adducts are associated with the maleimide groups during polymerization of the latex particulates.

7. A latex dispersion as in claim 6, wherein the maleimide groups are active maleimide groups after removal of the blocking groups.

8. A latex dispersion as in claim 6, wherein the blocking groups used to protect the maleimide groups during polymerization are removed and residual components of the blocking groups remain present in the aqueous phase.

9. A latex dispersion as in claim 6, wherein the latex particulates are present in the aqueous phase at from 0.5 wt % to 20 wt %.

10. A latex dispersion as in claim 6, wherein the maleimide groups are active maleimide groups that are associated with nucleophilic groups of a molecule associated with the surface of the latex particulates.

11. A latex dispersion as in claim 10, wherein the molecule is a nucleophilic dye.

12. A latex dispersion as in claim 10, wherein the molecule is a nucleophilic biologically active molecule comprising at least one peptide.

13. An ink-jet ink, comprising a colorant and the latex dispersion of claim 6.

14. A latex-containing ink-jet ink, comprising:
   a) a liquid vehicle;
   b) a colorant dissolved or dispersed in the liquid vehicle; and
   c) latex particulates dispersed in the liquid vehicle, said latex particulates formed by the steps of:
      i. preparing a monomer emulsion including an aqueous phase and an organic monomer phase, said organic monomer phase including at least one blocked maleimide monomer in which a maleimide group is protected by a Diels-Alder adduct,
      ii. polymerizing monomers of the organic monomer phase to form blocked maleimide latex particulates dispersed in the aqueous phase, and
      iii. unblocking the blocked maleimide latex particulates to form latex particulates with active meleimide groups at least on the surface of the latex particulates, wherein the aqueous phase is at least part of the liquid vehicle.

15. A latex-containing ink jet ink as in claim 14, wherein the colorant is a pigment.

16. A latex-containing ink jet ink as in claim 14, wherein the colorant is a dye.

17. A latex dispersion, comprising:
   a) an aqueous phase; and
   b) latex particulates dispersed in the aqueous phase, said latex particulates including active maleimide groups which are present at least at a surface of the latex particulates,
   wherein the active maleimide groups are associated with nucleophilic groups of a molecule associated with the surface of the latex particulates.

18. A latex dispersion as in claim 17, wherein the molecule is a nucleophilic dye.

19. A latex dispersion as in claim 17, wherein the molecule is a nucleophilic biologically active molecule comprising at least one peptide.

20. A latex dispersion as in claim 17, wherein the latex particulates are present in the aqueous phase at from 0.5 wt % to 20 wt %.

* * * * *

UNITED STATES PATENT AND TRADEMARK OFFICE
CERTIFICATE OF CORRECTION

PATENT NO. : 7,910,649 B2
APPLICATION NO. : 11/545863
DATED : March 22, 2011
INVENTOR(S) : Sivapackia Ganapathiappan et al.

It is certified that error appears in the above-identified patent and that said Letters Patent is hereby corrected as shown below:

In column 14, line 54, in Claim 6, delete "wherein particulates" and insert -- wherein the latex particulates --, therefor.

In column 15, line 27, in Claim 14, delete "meleimide" and insert -- maleimide --, therefor.

In column 16, line 4, in Claim 15, delete "ink jet" and insert -- ink-jet --, therefor.

In column 16, line 6, in Claim 16, delete "ink jet" and insert -- ink-jet --, therefor.

Signed and Sealed this
Twenty-second Day of November, 2011

David J. Kappos
*Director of the United States Patent and Trademark Office*